United States Patent [19]

Wiesemann et al.

[11] Patent Number: 5,598,066

[45] Date of Patent: Jan. 28, 1997

[54] TWO-LEVEL SECURITY LIGHTING SYSTEM

[75] Inventors: David L. Wiesemann, Benton Township, Berrien County, Mich.; Daniel E. Schaaf, Michigan City, Ind.; Wai-Shing P. Ko, Kwai Chung, Hong Kong

[73] Assignee: Heath Company, Benton Harbor, Mich.

[21] Appl. No.: 600,823

[22] Filed: Feb. 13, 1996

Related U.S. Application Data

[63] Continuation of Ser. No. 282,986, Jul. 29, 1994, abandoned.

[51] Int. Cl.$^6$ ........................ H05B 37/02
[52] U.S. Cl. .............. 315/159; 315/155; 315/149; 250/338.1; 250/238
[58] Field of Search .................. 315/149, 153, 315/154, 155, 159; 340/469; 250/238, 338.1, 221

[56] References Cited

U.S. PATENT DOCUMENTS

| | | | |
|---|---|---|---|
| 3,177,399 | 4/1965 | Morton | 315/201 |
| 4,225,808 | 9/1980 | Saraceni | 315/154 X |
| 4,233,545 | 11/1980 | Webster et al. | 315/154 X |
| 4,604,524 | 8/1986 | Kotlicki et al. | 250/342 |
| 4,800,278 | 1/1989 | Taniguti et al. | 250/338.1 |
| 4,823,051 | 4/1989 | Young | 315/155 |
| 4,843,283 | 6/1989 | Chen | 315/153 |
| 4,943,712 | 7/1990 | Wilder | 250/221 |
| 4,982,176 | 1/1991 | Schwarz | 340/342 |
| 5,015,994 | 5/1991 | Hoberman et al. | 340/567 |
| 5,231,373 | 7/1993 | Freeman et al. | 340/469 |
| 5,293,097 | 3/1994 | Elwell | 315/154 |
| 5,349,330 | 8/1994 | Diong et al. | 340/567 |
| 5,414,263 | 5/1995 | Haslam et al. | 250/338.1 |

FOREIGN PATENT DOCUMENTS 6-90995  5/1994  Japan.

OTHER PUBLICATIONS

Regent Lighting, "Installing and operating MBL200 series lighting fixtures", Aug. 1995.

Heath Zenith, "Instructions for the Reflex SL–5315–A Pulse Count Motion Sensor Light Control", 1989, Title Page and pp. 2–15.

Nippon Ceramic Co., Ltd., "PIR Passive Infrared Energy Control Switch Instruction Manual", Undated but published more than 1 year before the filing date or the parent application Ser. No. 08/282,986, filed on Jul. 29, 1994.

*Primary Examiner*—Robert Pascal
*Assistant Examiner*—Haissa Philogene
*Attorney, Agent, or Firm*—Fitch, Even, Tabin & Flannery

[57] ABSTRACT

A security light has a quartz-halogen lamp, a photocell, a passive infrared sensor for detecting motion external to the security light, and a circuit which causes the quartz-halogen lamp to operate at about 50% of full brightness in the absence of detection of motion at night, to operate at 95% of full brightness for a predetermined time interval in response to detection of motion at night, and to be off while the photocell is detecting daylight. A switch allows the user to select a different mode of operation which is similar except that the lamp is kept off in the absence of detection of motion at night. A user-initiated override mode is also provided, which causes the lamp to continuously operate at 95% of full brightness until the photocell detects daylight or until the user disables the override mode.

13 Claims, 4 Drawing Sheets

TWO-LEVEL SECURITY LIGHTING SYSTEM

This is a continuation, of application Ser. No. 08/282,986, filed Jul. 29, 1994, now abandoned.

FIELD OF THE INVENTION

The present invention relates generally to a security light and, more specifically, to a security light of the type which has a passive infrared detector that controls the level of illumination as a function of detection of motion.

BACKGROUND OF THE INVENTION

There are known security lights, commonly used for security areas such as parking lots, which use a conventional high pressure sodium (HPS) lamp or mercury vapor (MV) lamp. The HPS and MV lamps are normally operated continuously at full brightness, except when they are off. They have traditionally been preferred for security applications because they have significantly longer operational lifetimes than incandescent lamps, for example on the order of 15,000 to 20,000 hours in comparison to about 2,000 hours for an incandescent lamp. The longer operational lifetime is important not only to optimize the security effect of the bulb, but also because of the inconvenience involved in frequently changing incandescent lights which may be 20 feet in the air on a light pole in a parking lot. While these known lights have been generally adequate for their intended purposes, they have not been satisfactory in all respects.

More specifically, MV lamps are not the most energy efficient lamps available, and may be made illegal in the near future for most or all applications. Further, it is not considered appropriate to operate MV or HPS lamps under control of a sensor so that they are normally off but are turned on in response to detection of a condition such as motion, both because HPS and MV lamps usually take several minutes to progressively turn on, and because turning them on and off degrades them and should therefore be done only once a day in order to optimize their operational lifetimes.

There are other existing security lights which have the capability to turn on rapidly. These lights typically have an incandescent lamp, a passive infrared detector, a photocell, and a circuit which keeps the lamp off when the photocell is detecting daylight, which keeps the lamp off at night in the absence of detection of motion by the infrared detector, and which turns the lamp on for a predetermined time interval in response to detection of motion at night. These known units also have an override mode, which a user can actuate by turning power to the unit off and on with a wall switch that supplies electrical power to the light. In the override mode, the light is forced continuously on until the user disables the override mode using the wall switch, or until the photocell detects daylight and disables the override mode.

This latter type of security light is typically not used in applications such as a commercial or industrial parking lot where light must be provided continuously at night, because of the power consumption of the incandescent bulbs, and because of the somewhat limited life of incandescent bulbs when operated at full brightness. The lifetime of a typical incandescent bulb may be only about 2000 hours. In addition, these known security lights are either fully off or fully on, and are thus not suitable for use in certain security applications where the light must be emitting illumination in order to be useful.

An object of the present invention is therefore to provide a light which has a lamp with a relatively long operational lifetime, and which can provide illumination throughout the night in a manner which is highly energy efficient and is suitable for security applications.

SUMMARY OF THE INVENTION

The objects and purposes of the invention, including those set forth above, are met by providing an apparatus which includes: a sensor arrangement for detecting a predetermined condition external to the apparatus; a lamp which can emit a first level of illumination and which can emit a second level of illumination substantially greater than the first level of illumination, the lamp being capable of switching rapidly from the first level of illumination to the second level of illumination; and a control circuit coupled to the lamp and responsive to the sensor arrangement for causing the lamp to emit light at the first level of illumination in the absence of the predetermined condition, and for causing the lamp to emit light at the second level of illumination in response to detection of the predetermined condition.

BRIEF DESCRIPTION OF THE DRAWINGS

A preferred embodiment of the present invention is described in detail hereinafter with reference to the accompanying drawings, in which.

DETAILED DESCRIPTION

Figure 1:
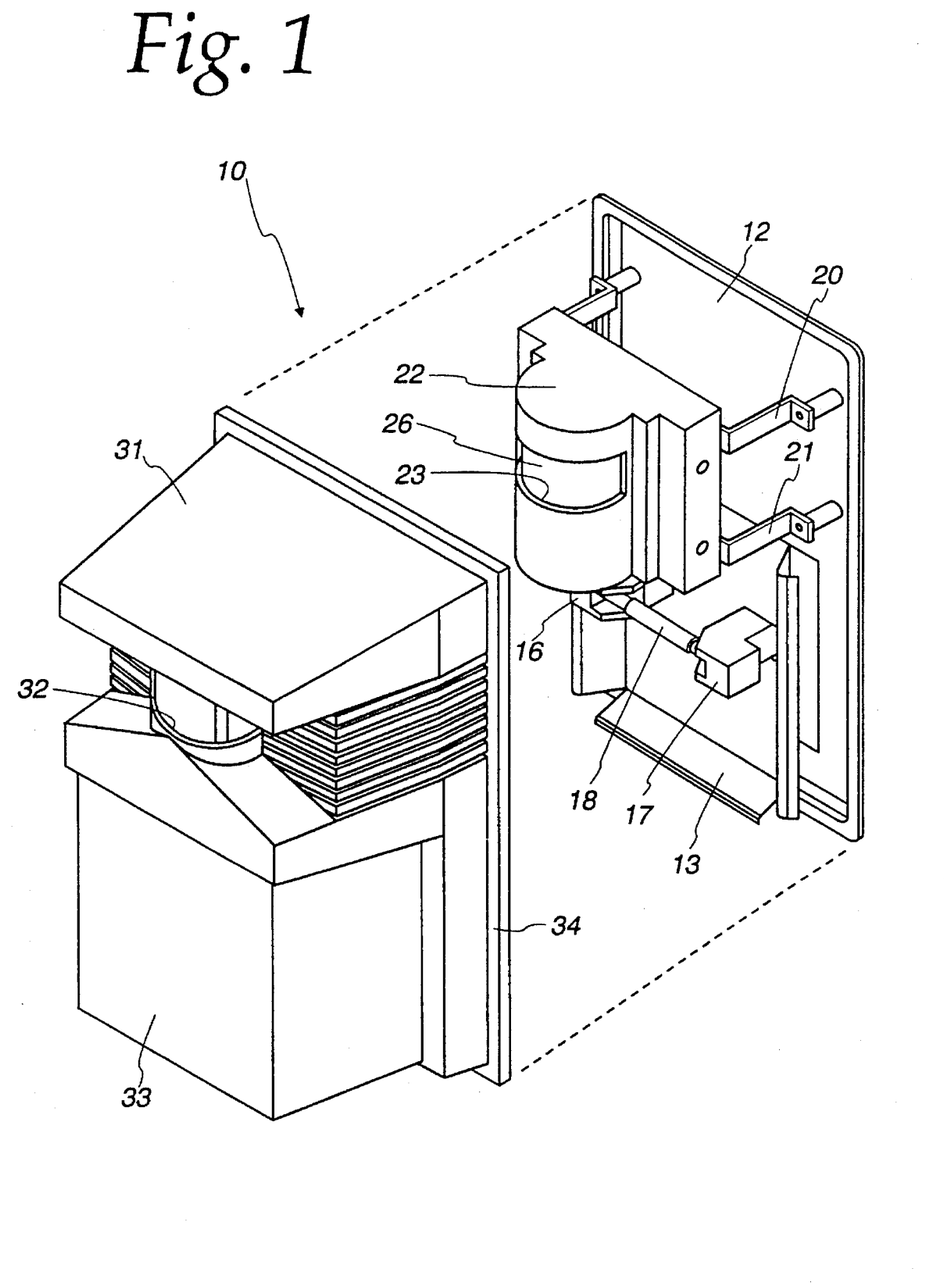
FIG. 1 is an exploded diagrammatic perspective view of a security light which embodies the present invention.

Referring to FIG. 1, a security light which embodies the present invention is designated generally with reference numeral 10. The light 10 includes a metal chassis 12 that can be fixedly mounted on a wall, and a metal reflector 13 which is fixedly mounted on the chassis. Two spaced lamp holders 16 and 17 are fixedly secured to the chassis 12 and project forwardly through respective spaced openings in the reflector 13. An incandescent lamp 18, which is a generally cylindrical quartz-halogen lamp, has each end supported by an outer end of a respective one of the holders 16 and 17, the lamp 18 having at each end a contact which electrically engages a further contact provided on a respective one of the associated holders 16 or 17.

Figure 2:
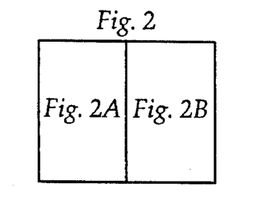
FIGS. 2A and 2B, are a schematic diagram of an electrical circuit provided within the security light of FIG. 1.
Figure 2A:
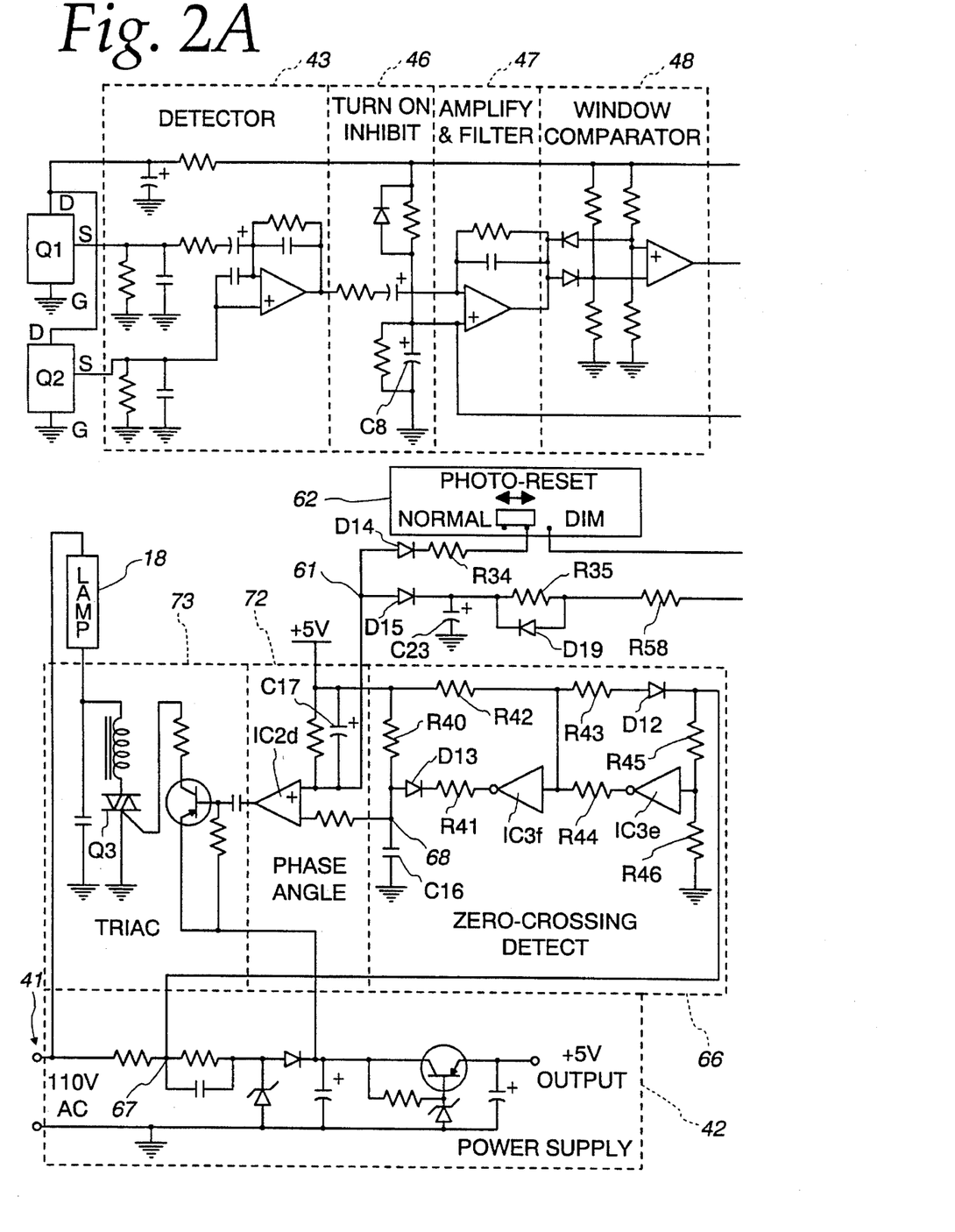
Figure 2B:
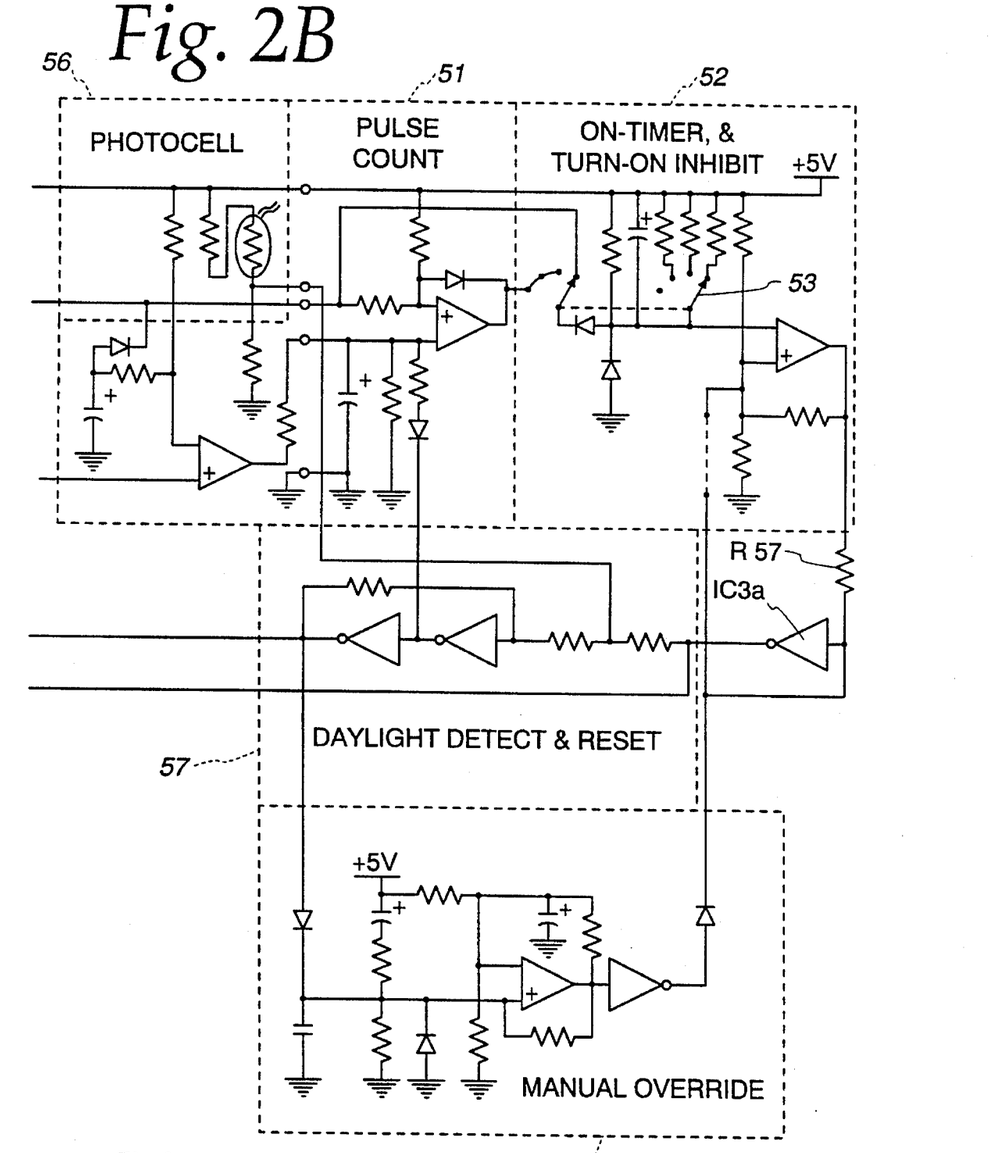

Two U-shaped brackets 20 and 21 each have legs with outer ends fixedly secured to the chassis 12, and a housing 22 is fixedly mounted on the brackets 20 and 21. The housing 22 has an opening 23 in a curved wall portion on its front side, and a curved lens 26 is disposed within the housing 22 so as to extend across the opening. The housing 22 has within it a circuit, which is depicted in the schematic diagram of FIG. 2, and which is described in more detail later. The circuit within the housing 22 is electrically coupled to the contacts on the lamp holders 16 and 17 by wires which are not visible in FIG. 1, and is coupled to a conventional external source of 120 VAC power by wires which are not visible in FIG. 1.

The security light 10 further includes a cover 31 having an edge portion 34 that can be fixedly coupled to the peripheral edge of chassis 12 in any suitable and conventional manner, for example by not-illustrated screws. The cover 31 has a curved wall portion with an opening 32 that is closely adjacent and aligned with the opening 23 in the housing 22 when the cover 31 is mounted on chassis 12. The housing 31 also includes a translucent lens portion 33, through which light from the lamp 18 can pass in directions forwardly, downwardly and to both sides. In order to minimize the entry of moisture into the light 10, a rubber or foam gasket (not visible in FIG. 1) is provided on the side of peripheral edge 34 facing the chassis 12 so as to extend around the entire peripheral edge, and this gasket creates a seal between the cover 31 and chassis 12 when cover 31 is installed on chassis 12. Likewise, a foam or rubber gasket (not visible in FIG. 1) is provided on the rear side of the curved wall portion of cover 31 so as to extend around opening 32, and when cover 31 is installed on chassis 12 this gasket engages the front side of housing 22 in order to create a seal.

Turning to FIGS. 2A and 2B, the quartz-halogen lamp 18 is shown for clarity, but aside from lamp 18 the entire circuit of FIGS. 2A and 2B is disposed within the housing 22. The circuit of FIGS. 2A and 2B receives standard 120 VAC power at 41, and a power supply section 42 provides both 120 VAC and 5 VDC power to the rest of the circuit.

The circuit of FIGS. 2A and 2B includes two conventional passive infrared (PIR) sensors Q1 and Q2, which are mounted within housing 22 behind lens 26, and which are each responsive to infrared light produced by sources external to the lamp 18 and passing through the lens 26. Each sensor has a field of view of approximately 110° about a not-illustrated vertical axis, and the sensors Q1 and Q2 are mounted within the housing 22 so that their fields of view overlap by only about 20°, and thus they have a combined field of view of about 190°.

The sensors Q1 and Q2 are each coupled to a detector portion 43 of the circuit, which detects any significant change in the output of either sensor, and which filters and amplifies the resulting signal so as to select and amplify signals most likely to correspond to infrared signals from a human body.

The output of the detector portion 43 is supplied to a turn-on inhibit portion 46, which essentially disables the output of the detector portion 43 when 120 VAC power is first applied to the circuit, until the circuit has stabilized. More specifically, the output of the detector portion 43 is disabled until capacitor C8 has charged to an appropriate voltage. The output of the turn-on inhibit portion 46 is supplied to an amplification and filtering portion 47, which effects further filtering and amplification.

The output of the amplification and filtering portion 47 is coupled to a window comparator portion 48. The window comparator portion 48 monitors the incoming signal for a positive spike having an amplitude exceeding a predetermined positive limit or a negative spike having an amplitude exceeding a predetermined negative limit, the region between the limits being a range or "window" that corresponds to noise and should be ignored. When a positive or negative spike exceeding the range or window is detected, it is rectified, so that the window comparator portion 48 outputs only negative pulses in response to each positive or negative input spike in excess of the range or window.

The output of the window comparator portion 48 is supplied to a pulse count portion 51, which looks for the occurrence of two successive output pulses from the window comparator portion 48 within a predetermined time interval, and which requires that the first of the two pulses have a width greater than a predetermined minimum. The purpose of the pulse count portion 51 is to reduce the likelihood of false triggering due to a single spurious pulse. If the pulse count portion 51 detects two acceptable pulses within the specified time period, it produces an output to an on-timer and turn-on inhibit portion 52.

The on-timer and turn-on inhibit portion 52 controls the amount of time that the lamp 18 is activated in response to detection of motion by the sensors Q1 and Q2. In particular, the portion 52 includes a ganged dual manual switch 53 with multiple settings, the switch 53 being manually set to select one of several predetermined on-time intervals, which in the preferred embodiment include 1, 5 and 20 minute intervals. The on-timer and turn-on inhibit portion 52 also includes circuitry which, for a predetermined time interval after 120 VAC power is initially applied to the circuit of FIGS. 2A and 2B, inhibits activation of the lamp 18 in response to signals from sensors Q1 and Q2.

A photocell 56 detects the presence or absence of daylight, and has an output coupled to a daylight detect and reset portion 57 of the circuit. The daylight detect and reset portion 57 is responsive to the output of the photocell 56 for effectively disabling the output of the on-timer and turn-on inhibit portion 52 during daylight hours, so that signals from the sensors Q1 and Q2 do not cause the lamp 18 to be turned on during daylight hours.

A manual override portion 58 is normally inactive, but is activated in response to 120 VAC power being on, then being turned off momentarily, and then being turned promptly back on. When activated, the manual override portion 58 essentially forces the on-timer and turn-on inhibit portion 52 into a condition in which it produces an output to actuate the lamp 18 indefinitely while it remains dark out. The manual override portion 58 is responsive to the daylight detect and reset portion 57 and the photocell 56 in a manner so that manual override portion 58 is automatically reset to its normal condition at dawn.

In the circuit of FIGS. 2A and 2B the voltage at a node 61 serves as a threshold for a purpose described in more detail later. The output of the on-timer and turn-on inhibit portion 52 is coupled to the node 61 through a resistor R57, an inverter IC3a, a resistor R58, a resistor R35 in parallel with a diode D19, and a diode D15 having its cathode connected to ground through a capacitor C23. Thus, when the output of the portion 52 is respectively actuated and deactuated, different threshold voltages will be created at the node 61. The output of inverter IC3a is also coupled to the node 61 through the daylight detect and reset portion 57, a switch 62, a resistor R34, and a diode D14. The switch 62 has two positions, in which it respectively effects and interrupts an electrical connection from the daylight detect and reset portion 57 to the resistor R34. When the switch 62 is set to the position where it effects the electrical connection, the threshold voltage at node 61 is also dependent on the state of the photocell 56.

Figure 3:
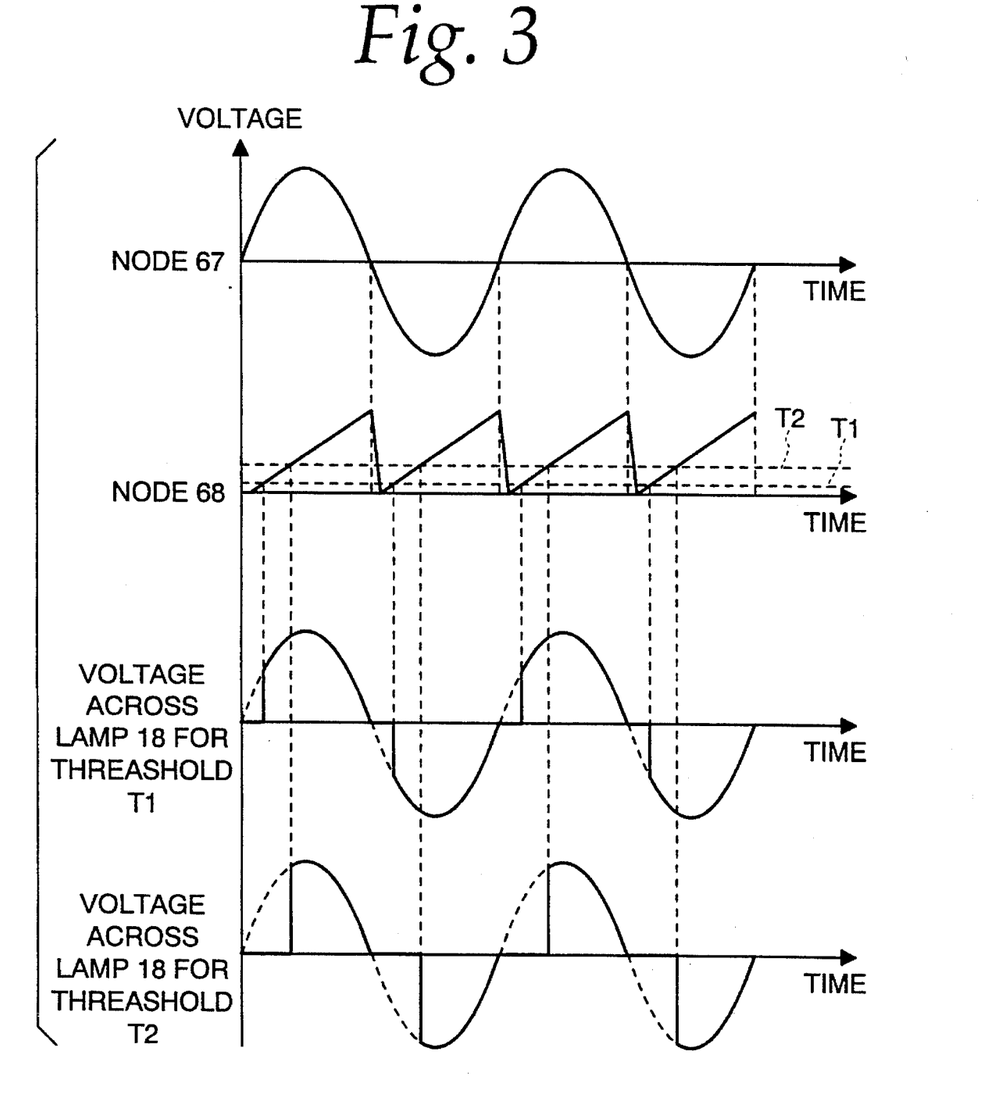
FIG. 3 is a timing diagram showing waveforms of selected electrical signals from the circuit of FIGS. 2A and 2B.

A zero crossing detect portion 66 of the circuit receives at node 67 an input signal from the power supply portion 42. This input signal is a sine wave derived from the 120 VAC input voltage, as shown at the top of FIG. 3. Inverters IC3e and IC3f, resistors R41 through R46, and diode D12 effect a full wave rectification of the sine wave signal. Then, during each half-wave cycle, the capacitor C16 is slowly charged from the 5 volt supply through resistor R40 so as to create a ramp voltage. Capacitor C16 is then rapidly discharged through diode D13 at the end of each half-wave cycle, in particular at a time corresponding to the zero crossing of the sine wave at node 67. This ramp voltage created on the capacitor C16 at node 68 is shown in FIG. 3. It will be noted that each pulse or ramp of the waveform at node 68 begins just after and is synchronized to a respective zero crossing point of the sine wave at node 67. The ramp waveform at node 68 serves as the output of the zero crossing detect portion 66.

A phase angle control portion 72 of the circuit is responsive to the output of the zero crossing detect portion 66 and the threshold voltage at node 61 for actuating a triac Q3 in a triac portion 73. More specifically, the phase angle control portion 72 includes a comparator IC2d having one input to which is applied the ramp signal at node 68 and having a further input to which is applied the threshold voltage at node 61. When the ramp voltage exceeds the threshold voltage, the comparator produces an output which turns on the triac Q3, so that the 120 VAC input signal is applied to the lamp 18. For example, with reference to FIG. 3, when the threshold voltage at node 61 has a level T1, the triac is turned on when the ramp voltage at node 68 reaches level T1. FIG. 3 shows the corresponding voltage across lamp 18 for threshold T1, where the voltage across the lamp is zero during the first portion of a half wave until the triac is turned on, and then the triac applies the half wave voltage across the lamp during the remainder of that half wave. FIG. 3 also shows the resulting voltage across lamp 18 for a different threshold T2. By comparing the voltages across the lamp 18 for thresholds T1 and T2, it will be evident that more energy is supplied to the lamp 18 when using threshold T1 than when using threshold T2, as a result of which the lamp 18 will emit more light at threshold T1 than at threshold T2.

When the threshold voltage at node 61 is changing, the capacitor C17 causes the threshold voltage at node 61 to change progressively rather than instantaneously from one voltage level to another. Thus, with reference to FIG. 3, if the circuit is changing the threshold voltage at node 61 from level T1 to T2, the waveform of the voltage across lamp 18 will change progressively from that shown in FIG. 3 for threshold T2 to that shown in FIG. 3 for threshold T1, so that the lamp 18 increases progressively in brightness during the change. This feature is referred to as a "slow turn-on" feature. When the lamp 18 is being turned on to full brightness, capacitor C23 and resistors R35 and R58 retard the setting of node 61 to the full brightness trigger level. When the lamp is turned off, diode D19 rapidly charges capacitor C23 so that the lamp extinguishes almost immediately. Although the progressive change in brightness for slow turn-on takes several cycles of the sine wave, the change appears to the human eye to be almost instantaneous.

The circuit shown in FIGS. 2A and 2B is capable of operating the security light 10 of FIG. 1 in three different modes of operation, namely a motion sensing accent mode, a motion sensing full bright mode, and a manual override mode. The user selects one of the two motion sensing modes using the manual switch 62 (FIGS. 2A and 2B, and can actuate the override mode from a standard wall switch that is supplying 120 VAC power to the light 10, in order to override operation in either motion sensing mode.

Starting with the motion sensing accent mode, this mode is selected by setting the switch 62 so that the it electrically couples the daylight detect and reset portion 57 to the resistor R34. In this mode, the photocell 56 maintains at node 61 during daylight hours a threshold voltage which keeps the lamp 18 off. At night, the photocell 56 causes a different threshold voltage to appear at node 61, which in turn causes the triac Q3 to be turned on for a limited portion of each half wave cycle, so that the lamp 18 emits about 50% of the light that it would emit at full brightness, in order to provide a pleasant level of light that will "accent" a home or security area in the absence of any detection of motion. If at some point the sensors Q1 and Q2 detect motion, then the detector portion 43, turn-on inhibit portion 46, amplification and filtering portion 47, window comparator portion 48 and pulse count portion 51 will actuate the on-timer and turn-on inhibit portion 52, which in turn will produce a different threshold voltage at node 61 that causes the triac to be turned on during most of each half-wave cycle, so that the lamp 18 emits about 95% of the light which it would emit at full brightness. The lamp emits this higher level of light for a time interval selected by the user using switch 53, and then the on-timer and turn-on inhibit portion changes its output in order to return the threshold voltage at node 61 to the value at which the lamp produces the lower level of light.

A conventional quartz-halogen lamp of the type shown at 18 in FIG. 1, when operated at 100% of full brightness, has an expected life time of about 2,000 hours. When operated respectively at 95%, 90%, 65%, and 50% of full brightness, the same lamp has respective expected operational lifetimes of about 3,500 hours, 6,100 hours, 389,000 hours (theoretical), and 6,384,000 hours (theoretical). Thus, when operated in the accent mode at 50% of full brightness, with infrequent periods of brief operation at 95% of full brightness, the quartz-halogen lamp 18 will enjoy a relatively long operational lifetime.

Turning to the motion sensing full bright mode, the switch 62 is manually set to interrupt the connection between the daylight detect and reset portion 57 and the resistor R34. As a result, the photocell 56 does not automatically turn the lamp 18 on at night, and does not produce during the night a threshold voltage at node 61 which would cause the lamp 18 to be turned on at any level of brightness. Consequently, the lamp 18 is only turned on at night if the sensors Q1 and Q2 detect motion. In particular, when motion is detected at night, the on-timer and turn-on inhibit circuit 52 turns the lamp 18 on at 95% of full brightness for the time interval which the user has selected using switch 53, after which lamp 18 is turned completely off until motion is again detected during the night. It will be noted that, even in the "full bright" mode, the lamp is actually operated at levels of brightness which never exceed 95% of its true full brightness.

The third mode is the manual override mode, which is controlled by the manual override portion 58 of the circuit of FIGS. 2A and 2B. During the day, the photocell 56 keeps the manual override portion 58 in a reset condition, and the manual override portion 58 will remain in the reset condition at night unless it is intentionally actuated by a user. The user actuates the manual override portion 58, when 120 VAC power is being supplied to the circuit of FIGS. 2A and 2B by turning off 120 VAC power and then promptly turning it back on, for example using a standard wall switch controlling AC power to the security light 10. When the manual override portion 58 is actuated in this manner, it forces the on-timer and turn-on inhibit portion 52 to produce an output signal that turns the lamp 18 on at 95% of full brightness, and the manual override portion 58 will keep the lamp 18 continuously on at this brightness level until the manual override portion 58 is reset by one of two events. The first event occurs if the user switches the unit back to one of the two motion sensing modes by again using the wall switch to toggle 120 VAC power off and on. The second event is the occurrence of dawn, because daylight causes the photocell 56 to reset the manual override portion 58.

Although the preferred embodiment uses an incandescent lamp which is a quartz-halogen bulb, it will be recognized that other incandescent lamps could alternatively be used, including conventional floodlight bulbs and incandescent household light bulbs.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus comprising:

first sensor means for detecting a first predetermined condition external to said apparatus, said first predetermined condition being motion relative to said first sensor means of a person or an object separate from said apparatus;

second sensor means for detecting a second predetermined condition, said second predetermined condition being a predetermined level of light external to said apparatus;

a lamp which can emit a first level of illumination and which can emit a second level of illumination substantially greater than said first level of illumination, said lamp capable of switching rapidly from said first level of illumination to said second level of illumination; and control circuit means coupled to said lamp and responsive to said first and second sensor means for causing said lamp to emit light at said first level of illumination in response to said second predetermined condition in the absence of said first predetermined condition, and for causing said lamp to emit light at said second level of illumination in response to detection of said first predetermined condition, said control means including selectively actuable manual override means for selectively overriding said first and second sensor means by manual actuation to cause said lamp to emit light at said second level of illumination, said manual override means including means for disabling said lamp in the absence of said second predetermined condition after said manual override means has been selected.

2. An apparatus according to claim 1, wherein said control circuit means includes means for causing said second level of illumination to be approximately 95% of full brightness of said lamp.

3. An apparatus according to claim 1, wherein said sensor means includes a passive infrared detector.

4. An apparatus according to claim 1, wherein said lamp is a quartz-halogen lamp.

5. An apparatus as recited in claim 1, wherein said lamp is adapted to be electrically coupled to a source of electrical power and wherein said selectively actuable manual override means is actuated by toggling the electrical power source to said apparatus.

6. An apparatus comprising:

first sensor means for detecting a first predetermined condition external to said apparatus, said first predetermined condition being motion relative to said first sensor means of a person or object separate from said apparatus;

second sensor means for detecting a second predetermined condition, said second predetermined condition being a predetermined level of light external to said apparatus;

a lamp which can emit a first level of illumination and which can emit a second level of illumination substantially greater than said first level of illumination, said lamp being capable of switching rapidly from said first level of illumination to said second level of illumination; and control circuit means coupled to said lamp and responsive to said first and second sensor means for causing said lamp to emit light at said first level of illumination in the absence of said first predetermined condition in response to said second predetermined condition, and for causing said lamp to emit light at said second level of illumination in response to detection of said first predetermined condition;

wherein said control circuit means includes means responsive to detection of said first predetermined condition for initiating measurement of a predetermined time interval, and responsive to expiration of said time interval for causing said lamp to thereafter emit light at said first level of illumination in response to said second predetermined condition in the absence of a recurrence of said first predetermined condition.

7. An apparatus comprising:

sensor means for detecting a predetermined condition external to said apparatus;

a lamp which can emit a first level of illumination and which can emit a second level of illumination substantially greater than said first level of illumination, said lamp being capable of switching rapidly from said first level of illumination to said second level of illumination; and control circuit means coupled to said lamp and responsive to said sensor means for causing said lamp to emit light at said first level of illumination in the absence of said predetermined condition, and for causing said lamp to emit light at said second level of illumination in response to detection of said predetermined condition;

light sensing means responsive to light external to said apparatus for causing said control circuit means to maintain said lamp in an off condition during daylight hours and to cause said lamp to emit light at said first level of illumination in the absence of both daylight and said predetermined condition, said control circuit means causing said lamp to emit light at said second level of illumination in response to detection of said predetermined condition in the absence of daylight, wherein said control circuit means includes selectively actuable manual override means for causing said lamp to continuously emit light at said second level of illumination by selectively overriding said sensor means by manual actuation.

8. An apparatus as recited in claim 7 further including means responsive to detection of daylight by said light sensing means for automatically deactuating said selectively actuable override means.

9. An apparatus comprising:

sensor means for detecting a predetermined condition external to said apparatus;

a lamp which can emit a first level of illumination and which can emit a second level of illumination substantially greater than said first level of illumination, said lamp being capable of switching rapidly from said first level of illumination to said second level of illumination; and control circuit means coupled to said lamp and responsive to said sensor means for causing said lamp to emit light at said first level of illumination in the absence of said predetermined condition, and for causing said lamp to emit light at said second level of illumination in response to detection of said predetermined condition, wherein said control circuit means is powered by an AC voltage, and wherein said control circuit means include switching means for selectively permitting and preventing the application of said AC voltage to said lamp and means for causing said switching means to be actuated for a selected portion of each half wave cycle of said AC voltage, said portion of said half waves being greater for said second level of illumination than for said first level of illumination.

10. An apparatus comprising:

sensor means for detecting a predetermined condition external to said apparatus;

a lamp which can emit a first level of illumination and which can also emit a second level of illumination substantially greater than said first level of illumination, said lamp being capable of switching rapidly from said first level of illumination to said second level of illumination;

control circuit means coupled to said lamp and responsive to said sensor means for causing said lamp to emit light at said first level of illumination in the absence of said predetermined condition, and for causing said lamp to emit light at said first level of illumination in the absence of said predetermined condition, and for causing said lamp to emit light at said second level of illumination in response to detection of said predetermined condition, wherein said control circuit means is powered by an AC voltage and wherein said control circuit mean includes switching means for selectively permiting and preventing the application of said AC voltage to said lamp and means for causing said switching means to be actuated for a selected portion of each half wave cycle of said AC voltage, said portion of said half waves being greater for said second level of illumination than for said first level of illumination; and a zero crossing detect circuit for detecting zero crossing points of said AC voltage, means for producing a ramp waveform having for each half wave of said AC voltage a ramp pulse which is initiated in response to detection of the zero crossing point for the half wave, a comparator which compares said ramp pulse to a threshold voltage, and which actuates said switching means at a point in time when said ramp voltage first exceeds said threshold voltage, and means responsive to said sensor means for causing said first threshold voltage to have a first value in the absence of said predetermined condition and a second value in response to detection of said predetermined condition.

11. An apparatus comprising:

sensor means for detecting a predetermined condition external to said apparatus;

a lamp which can emit a first level of illumination and which can also emit a second level of illumination substantially greater than said first level of illumination, said lamp being capable of switching rapidly from said first level of illumination to said second level of illumination;

control circuit means coupled to said lamp and responsive to said sensor means for causing said lamp to emit light at said first level of illumination in the absence of said predetermined condition, and for causing said lamp to emit light at said second level of illumination in response to detection of said predetermined condition, wherein said control circuit means is powered by an AC voltages, and wherein said control circuit means includes switching means for selectively permitting and preventing the application of said AC voltage to said lamp and means for causing said switching means to be actuated for a selected portion of each half wave cycle of said AC voltage, said portion of said half waves being greater for said second level of illumination than for said first level of illumination;

a zero crossing detect circuit for detecting zero crossing points of said AC voltage, means for producing ramp waveform having for each half wave of said AC voltage a ramp pulse which is initiated in response to detection of the zero crossing point for the half wave, a comparator which compares said ramp pulse to a threshold voltage, and which actuates said switching means at a point in time when the ramp voltage first exceeds said threshold voltage, and means response to said sensor means for causing said threshold to have a first value in the absence of said predetermined condition, and a second value in response to detection of said predetermined condition; and light sensing means responsive to light external to said apparatus for detecting the presence and absence of daylight, said circuit means including means responsive to said light sensing means for causing said threshold voltage to have a third value different from said first and second values when said light sensing means is detecting daylight.

12. An apparatus comprising:

first sensor means for detecting a first predetermined condition external to said apparatus, said first predetermined condition being motion relative to said first sensor means of a person or an object separate from said apparatus;

second sensor means for detecting a second predetermined condition, said second predetermined condition being a predetermined level of light external to said apparatus;

a lamp which can emit a first level of illumination and which can emit a second level of illumination substantially greater than said first level of illumination, said lamp capable of switching rapidly from said first level of illumination to said second level of illumination; and control circuit means coupled to said lamp and responsive to said first and second sensor means for causing said lamp to emit light at said first level of illumination in response to said second predetermined condition in the absence of said first predetermined condition, and for causing said lamp to emit light at said second level of illumination in response to detection of said first predetermined condition, said control circuit means including selectively actuable manual override means for selectively overriding said first and second sensor means by manual actuation to cause said lamp to emit light at said second level of illumination, said manual override means including means for disabling said lamp in the absence of said second predetermined condition after said manual override means has been selected, wherein said control circuit means includes means for generating a pulse each time said first predetermined condition is detected and further including means for counting said pulses and preventing said lamp from emitting illumination at said second level unless two or more pulses are counted.

13. An apparatus comprising:

first sensor means for detecting a first predetermined condition external to said apparatus, said first predetermined condition being motion relative to said first sensor means of a person or an object separate from said apparatus;

second sensor means for detecting a second predetermined condition, said second predetermined condition being a predetermined level of light external to said apparatus;

a lamp which can emit a first level of illumination and which can emit a second level of illumination substantially greater than said first level of illumination, said lamp capable of switching rapidly from said first level of illumination to said second level of illumination; and control circuit means coupled to said lamp and responsive to said first and second sensor means for causing said lamp to emit light at said first level of illumination in response to said second predetermined condition in the absence of said first predetermined condition, and for causing said lamp to emit light at said second level of illumination in response to detection of said first predetermined condition, said control circuit means including selectively actuable manual override means for selectively overriding said first and second sensor means by manual actuation to cause said lamp to emit light at said second level of illumination, said manual override means including means for disabling said lamp in the absence of said second predetermined condition after said manual override means has been selected; and means responsive to said first sensor means for automatically deactuating said selectively actuable manual override means in the absence of said second predetermined condition.

* * * * *

UNITED STATES PATENT AND TRADEMARK OFFICE
CERTIFICATE OF CORRECTION

PATENT NO. : 5,598,066
DATED : January 28, 1997
INVENTOR(S) : Wiesemann, et al.

It is certified that error appears in the above-indentified patent and that said Letters Patent is hereby corrected as shown below:

Column 9, line 67, delete "voltages," insert --voltage--

Column 10, line 9, after "producing" and insert --a-- therefor;

Column 10, line 14, delete "voltage," and insert --voltage-- therefor.

Signed and Sealed this

First Day of April, 1997

Attest:

BRUCE LEHMAN

Attesting Officer

Commissioner of Patents and Trademarks